Oct. 8, 1968

N. E. TILLOTSON ET AL 3,404,409

WORK GLOVE

Filed June 3, 1966

INVENTORS
NEIL E. TILLOTSON
SEBASTIAN A. CONSOLI
BY

Kenway, Jenney + Hildreth

ATTORNEYS

United States Patent Office 3,404,409
Patented Oct. 8, 1968

3,404,409
WORK GLOVE
Neil E. Tillotson, Dixville Notch, N.H., and Sebastian A. Consoli, Lawrence, Mass., assignors to Tillotson Corporation, Needham Heights, Mass., a corporation of Massachusetts
Filed June 3, 1966, Ser. No. 555,077
3 Claims. (Cl. 2—161)

ABSTRACT OF THE DISCLOSURE

The invention comprises a work glove having a base fabric, such as cotton, to which is bonded an undercoating of a highly flexible plastisol material having a very high percentage of plasticizer. An outer wear coating or "tread" consisting of discrete knobs of a vinyl chloride composition of relatively low flexibility having a relatively small percentage of plasticizer is bonded to the undercoating.

---

The present invention relates to work gloves and methods of making the same.

The object of the invention is to provide a work glove which is comfortable and flexible, which has high abrasion resistance and which affords a high degree of protection to the palms and fingers of the wearer's hands.

A common form of work glove is simply made of fabric such as canvas or flannel. While such gloves are comfortable and flexible they do not provide adequate protection when the wearer must handle rough or sharp objects. Rubber and vinyl gloves are usually hot and uncomfortable; furthermore, when they have sufficient thickness or stiffness to provide adequate protection for rough work they are very inflexible, and if made sufficiently flexible, they do not provide good protection or resistance to abrasion and tearing.

According to the present invention there is provided a work glove having a base of flexible material such as knitted cotton fabric, at least the palm and fingers being covered with a pattern of discrete knobs of thick tough solid polymeric composition. The separation between the applied knobs affords flexibility, but they are sufficiently close together to provide adequate protection to the palm and fingers in handling rough or sharp materials. The knobs are preferably arranged in rows or strips forming a non-aligned pattern, such as a criss-cross or herringbone, for maximum protection.

Figure 1:
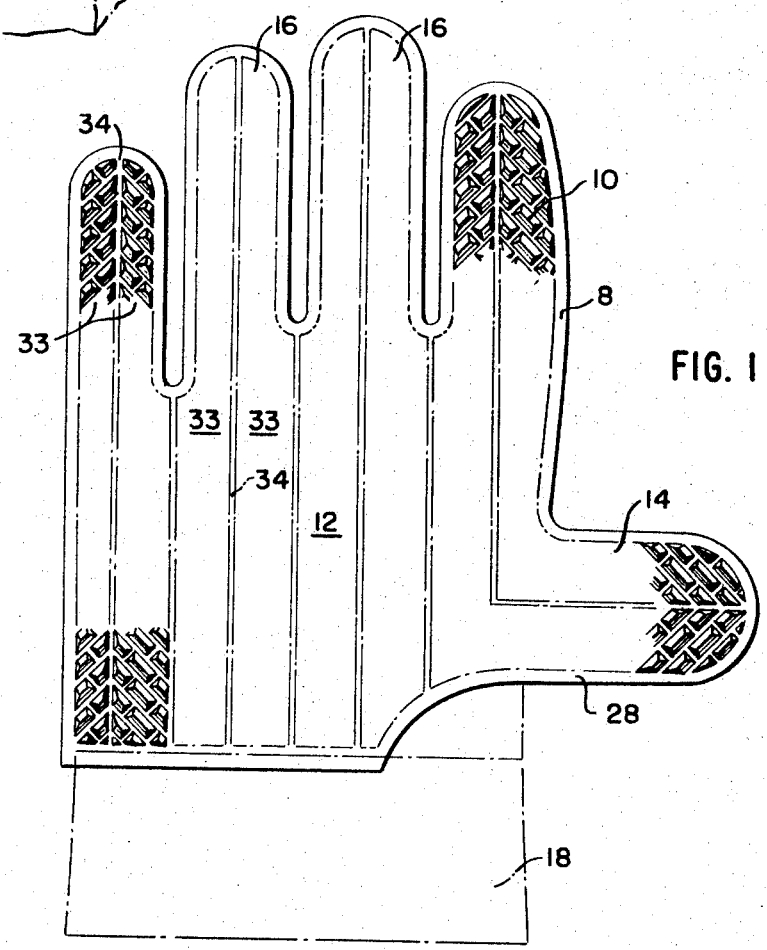
FIG. 1 is a face view of the preferred form of glove according to the present invention.
Figure 6:
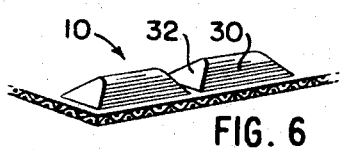
FIG. 6 is a perspective view on an enlarged scale to show the general shape of the knobs.

The glove facing shown in FIG. 1 comprises a base fabric which is preferably a knit material having on its surface a double coating of polymeric material. The undercoating 8 comprises a highly flexible layer, and the outer or wear coating comprises a series of discrete spots or knobs 10 of a tough abrasion resistant substance forming what may be termed a "tread" surface.

The facing thus prepared serves as one part of a glove constituting the palm 12, the thumb 14 and the fingers 16. A cuff 18 may then be sewn on to the facing. and the glove may be completed by sewing pieces of fabric to form a back in accordance with assembly methods usually employed for fabric work gloves.

The inner polymeric layer or undercoat 8 is preferably a commercial polyvinyl chloride plastisol composition having a very high percentage of plasticizer to give maximum adhesion and flexibility. It is, however, a high viscosity material so that it will not excessively penetrate the fabric.

The knobs 10 are conveniently a tough commercial polyvinyl chloride plastisol composition, also of high viscosity but having a much smaller percentage of plasticizer than the undercoat. The knobs themselves are not very flexible and because of their low plasticity would not adhere well to the fabric. It is for this reason that the highly plasticized undercoat is provided in order that the knobs will be firmly anchored to the base fabric.

Figure 2:
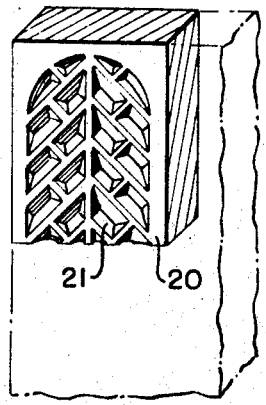
FIG. 2 is a fragmentary view of a mold or die for making the glove of FIG. 1.
Figure 3:
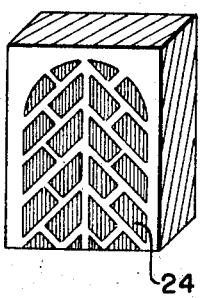
FIGS. 3 to 5 are diagrams illustrating the method of manufacture.

The preferred method of manufacture utilizes a die or mold which may comprise a flat metal plate suitably machined with depressions corresponding to the shape and arranged in the pattern of the knobs 10. The die is of a size to mold the tread pattern of the entire glove, but only a portion thereof is shown at 20 in FIGS. 2 to 5. The die has depressions 21 corresponding to the shape and pattern of the knobs of the "tread" surface. The plastisol 24 for the tread is rubbed or smeared into the depressions and is then smoothed off so that the various knobs are separate from one another, as shown in FIG. 3. The mold is then heated to a temperature and for a sufficient time to gel the plastisol according to known techniques.

Figure 4:
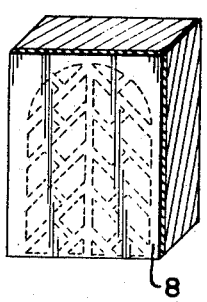

The undercoat 8 of highly plasticized high-viscosity plastisol is then applied in a thin coat, as by painting on the surface of the mold. It is rolled down to form a thin layer in contact with the individual knobs or spots, as shown in FIG. 4.

Figure 5:
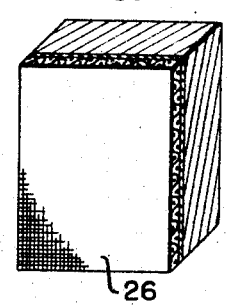

The fabric face 26 of the glove is then laid on the painted undercoat and smoothed down for contact therewith over all parts of its surface, as shown in FIG. 5.

The assembly is then heated in an oven sufficiently to fuse the plastisol layers causing the undercoat to bond both with the fabric and with the knobs of the tread surface. This is done in accordance with conventional plastisol technology. The glove facing may then be stripped from the mold.

The cloth base is then trimmed to the shape shown in FIG. 1. As there shown in FIG. 1, the fabric with the undercoat is slightly larger than the tread surface. This provides a margin 28 to serve as a stitching area for attachment of the cuff 18 and back portions of the glove, as above described.

The size of the tread knobs 10 may be as desired. Preferably they are of generally rectangular contour as viewed from above, each being about ¼ inch long and ⅛ inch wide, and with sloping sides 30 and ends 32 to facilitate stripping from the mold.

The knobs are preferably arranged in narrow rows or strips 33 extending along the fingers and palm, adjacent rows being separated by a narrow gap 34 throughout their length. The knobs are arranged at about a 45 degree angle from the long dimension of the strip and the angles are reversed from strip to strip so that the pattern has a herringbone or criss-cross appearance. Any desired pattern may be used but the herringbone pattern is preferred because the spaces between the knobs are not aligned across the palm and thus maximum protection is afforded against cutting of the wearer's hand by sharp edges of such things as sheet metal or glass. The gaps 34 contribute to the flexibility without appreciable loss of protection.

Although this invention has been described with specific reference to the preferred embodiments in which the polymeric materials are both polyvinyl chloride plastisol compositions, it will be understood that either or both of the coatings may be other rubbery or resinous polymers having the desired flexibility, adhesiveness and toughness.

Having thus described the invention, we claim:

1. A work glove comprising a fabric base having on the palm and fingers an adherent undercoating of a flexible polymeric composition having a high content of plasticizer, and a plurality of discrete small knobs of tough polymeric composition bonded to the undercoating and having a much smaller plasticizer content than the undercoating, the knobs being arranged in a non-aligned pattern on the palm and fingers.

2. A work glove as defined in claim 1, in which the knobs are arranged in separated rows along the fingers and palm, the knobs in adjacent rows being disposed at different angles to form a non-aligned criss-cross pattern between the knobs of adjacent rows.

3. A work glove as defined in claim 2, in which each knob is generally rectangular form, and the knobs are arranged at angles of about 45° in each row to provide a herringbone pattern.

References Cited

UNITED STATES PATENTS

| Re. 22,167 | 8/1942 | Wells et al. | 2—159 |
| 1,346,683 | 7/1920 | Reynolds | 2—168 |
| 2,187,430 | 1/1940 | Olmsted et al. | 2—161 X |
| 2,865,046 | 12/1958 | Bird | 2—167 X |

PATRICK D. LAWSON, *Primary Examiner.*

G. V. LARKIN, *Assistant Examiner.*